Aug. 7, 1945.     R. J. OLANDER     2,381,135
HAND BRAKE
Filed Sept. 25, 1943     3 Sheets-Sheet 1
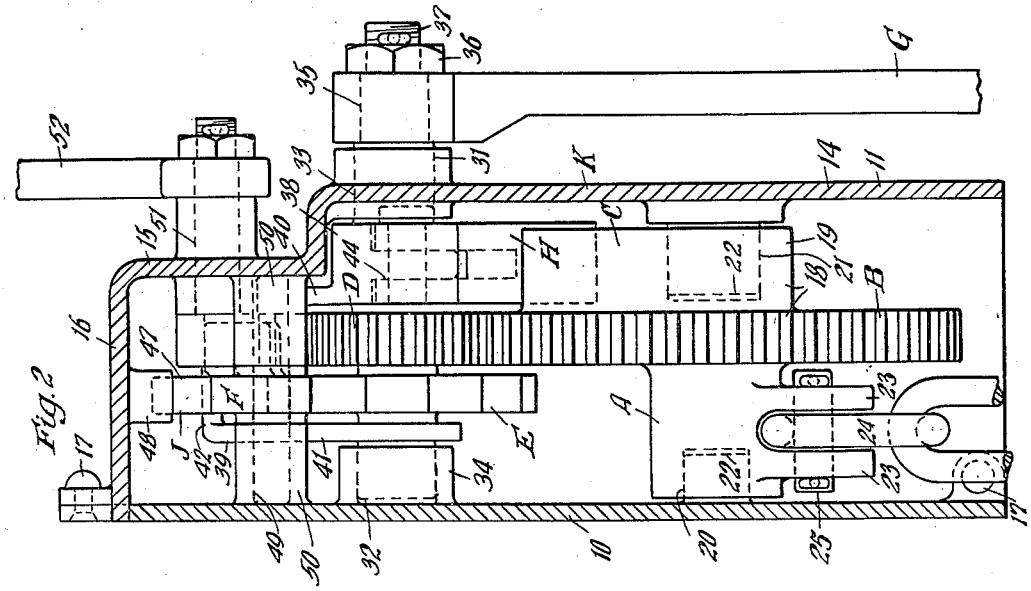
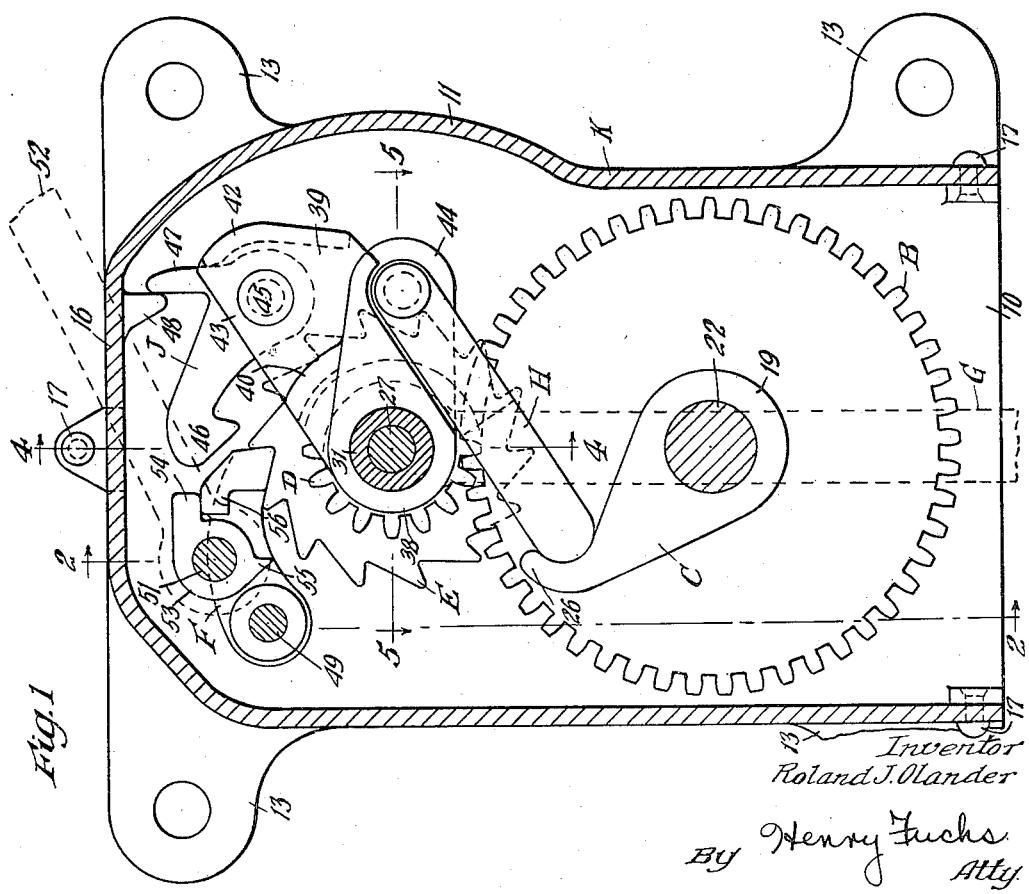
Inventor
Roland J. Olander
By Henry Fuchs
Atty.

Aug. 7, 1945.   R. J. OLANDER   2,381,135
HAND BRAKE
Filed Sept. 25, 1943   3 Sheets-Sheet 2
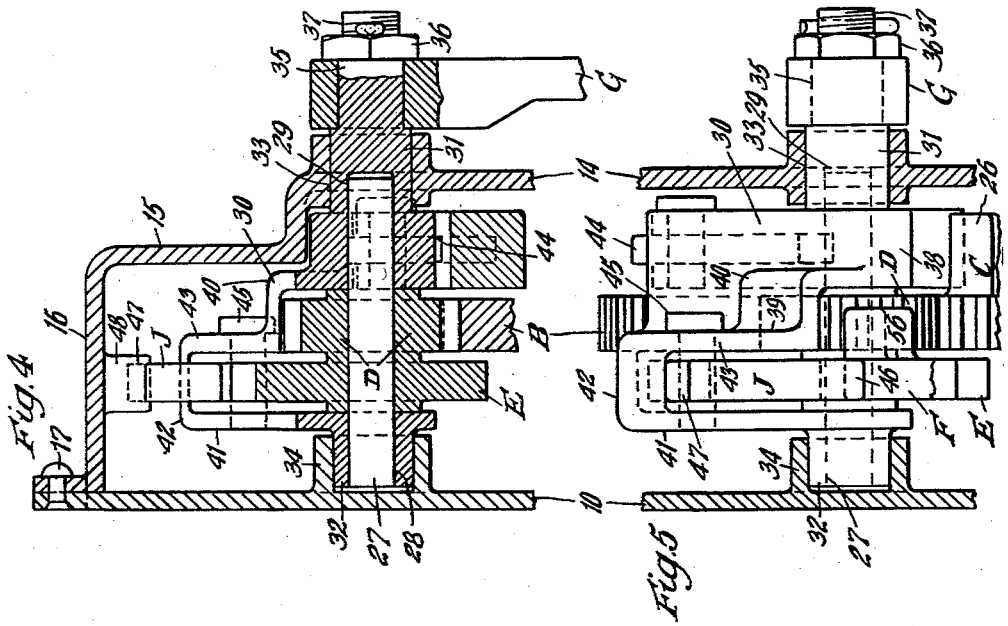
Inventor
Roland J. Olander
By Henry Fuchs, Atty.

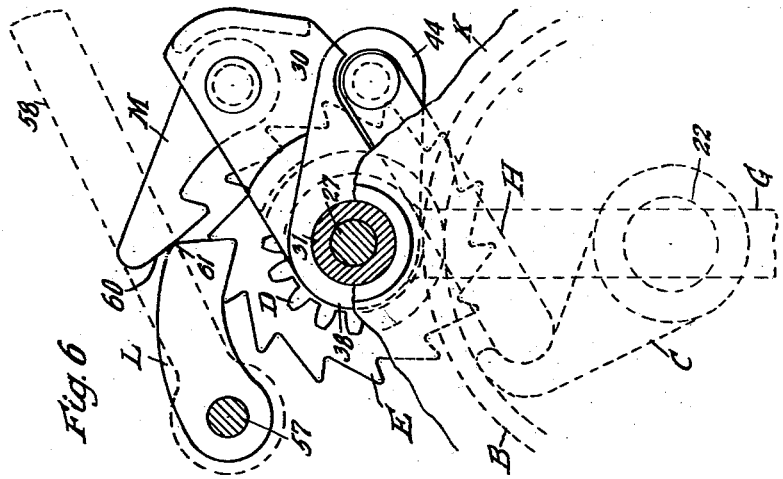
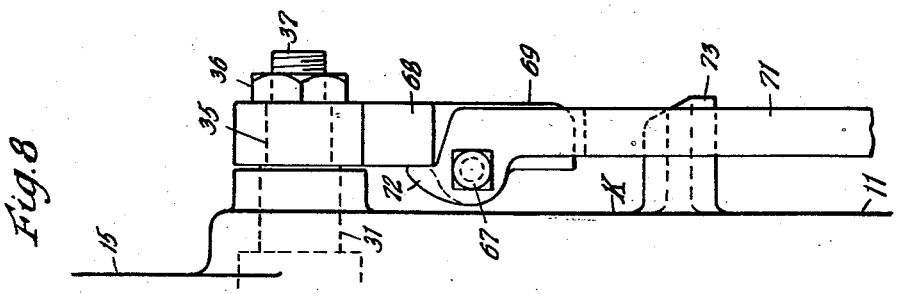
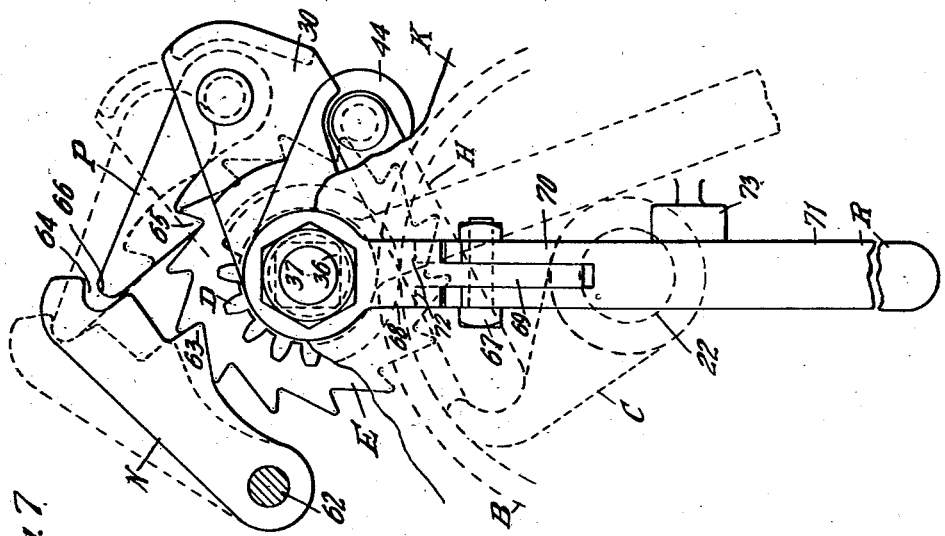

Patented Aug. 7, 1945

2,381,135

UNITED STATES PATENT OFFICE 2,381,135

HAND BRAKE

Roland J. Olander, Chicago, Ill., assignor to W. H. Miner, Inc., Chicago, Ill., a corporation of Delaware Application September 25, 1943, Serial No. 503,789

17 Claims. (Cl. 74—505)

This invention relates to improvements in hand brakes for railway cars.

One object of the invention is to provide a simple and efficient hand operated brake mechanism for railway cars having quick take-up during initial application of the brakes and high power multiplication during final application to obtain relatively high braking power for more effectively controlling the movements of the car.

Another object of the invention is to provide a hand operated brake including a chain winding means, wherein the power applied to the hand operated means is initially transmitted from the latter through a quick take-up mechanism to the winding means to quickly take up the slack in the brake chain and the power applied to the winding means is greatly increased during final application of the brakes by transmission from the hand operated means to the winding means through the medium of a power multiplying mechanism which is automatically brought into operation.

A more specific object of the invention is to provide a hand brake mechanism of the handle lever operated type, including a chain winding drum actuated by the handle lever through interposed motion transmitting means effective during initial application of the brakes, to impart rapid rotation to the drum to quickly take up the slack in the brake chain, and interposed power multiplying means effective during final application of the brakes to produce rotation of the winding means at relatively low speed to produce high braking power.

A further object of the invention is to provide a hand brake mechanism including a chain winding drum; power multiplying means comprising a gear of relatively large diameter fixed to said drum for rotation in unison therewith, a pinion operatively engaged with said gear, and a ratchet wheel rotatable with said pinion; a swingable hand operated lever having ratcheting engagement with the ratchet wheel for imparting intermittent rotation to the latter; and a quick take-up means comprising an arm rotatable with the chain winding drum, a push rod or link engageable with said arm to rotate the drum, said rod being operatively connected with the lever to produce reciprocating movement of said rod as the lever is swung to and fro.

Still another object of the invention is to provide in a hand brake mechanism as set forth in the preceding paragraph locking means for holding the winding drum against retrograde movement, comprising a pivoted locking dog cooperating with the ratchet wheel, wherein disengagement of the dog from locking relation with respect to the ratchet wheel is effected by swinging movement of the hand operated lever.

Other objects of the invention will more clearly appear from the description and claims hereinafter following.

In the drawings forming a part of this specification, Figure 1 is a vertical sectional view, through my improved hand brake mechanism. Figure 2 is a transverse vertical sectional view, corresponding substantially to the line 2—2 of Figure 1. Figure 3 is a view, similar to Figure 1, but showing the parts in different position. Figure 4 is a vertical sectional view, corresponding substantially to the line 4—4 of Figure 1, showing only the mechanism at the upper part of said figure. Figure 5 is a horizontal sectional view, corresponding substantially to the line 5—5 of Figure 1. Figure 6 is an elevational view of the upper part of the housing shown in Figure 1, partly broken away and to show the ratchet mechanism and associated parts of the brake, illustrating another embodiment of the invention. Figure 7 is a view, similar to Figure 6, illustrating still another embodiment of the invention. Figure 8 is a side elevational view of the operating handle lever mechanism shown in Figure 7, looking from left to right in said figure, and also showing in elevation a portion of the housing for the parts of the brake mechanism.

Referring first to the embodiment of the invention illustrated in Figures 1 to 5 inclusive, the hand brake mechanism proper is contained within a housing adapted to be mounted on the vertical wall of a railway car, it being the usual practice to mount the same on the end wall of the car with the brake chain depending, as illustrated in Figure 2.

My improved hand brake mechanism, as shown in Figures 1 to 5 inclusive, comprises broadly a rotary chain winding drum A; a gear wheel B fixed to the drum; an arm C also fixed to the drum; a pinion D meshing with the gear wheel B; a ratchet wheel E rotatable with said pinion; a locking dog F for the ratchet wheel; a throw-out hand lever for the locking dog; a swingable operating lever G for rotating the drum; a push rod or bar H connected to the lever G and cooperating with the arm C; and a pawl J connected to the lever G for actuating the ratchet wheel E.

The brake mechanism proper, as set forth in the preceding paragraph, is preferably contained in a housing K, as clearly shown in Figures 1 and 2. The housing K comprises a back wall 10, and a cover member 11. The back wall 10, which is in the form of a flat plate, is preferably provided with four perforated securing ears 13—13—13—13 by which the housing is fixed to the vertical wall of the car, the same being secured by the usual bolts extending through said ears and the wall of the car. As shown in Figure 1, the ears 13 project laterally beyond the corresponding side walls of the cover member 11. The ear 13 at the lower left hand corner of the plate 10 is shown as broken away in Figure 1 to accommodate said view to the sheet of drawings. The cover member 11 is of the vertical cross sectional shape shown in Figure 1 and has a front wall 14 parallel to the wall 10. The front wall 14, at the upper end of the housing, is offset inwardly, as indicated at 15 in Figure 2, for a purpose hereinafter pointed out. The housing is open at the bottom to accommodate the usual brake chain which leads from the chain winding drum to the brake mechanism proper of the car. At the top, the housing is closed by a horizontal wall 16 which is formed on the cover member 11. The cover member is secured to the back wall 10 by any suitable means 17, preferably comprising rivets, extending through the wall portions of the cover member 11 and lugs on the rear wall 10 of the housing.

The chain winding drum A, the gear wheel B, and the arm C are preferably made integral, being in the form of a one piece casting 18. As shown in Figure 2, the chain winding drum A is formed on one side of the gear wheel B, is concentric therewith, and forms, in effect, a hub member of said gear wheel. At the side of said gear opposite to the chain drum A is formed a hub member 19 having the arm C radially extending therefrom, the arm C being formed integral with said hub and the gear wheel B. The hub 19 and the hub formed by the winding drum A are provided with axially aligned journal openings 20 and 21 into which extend transversely aligned, cylindrical bearing projections or bosses 22 on the rear wall 10 and the front wall 14 of the housing K.

The drum A is provided with radially projecting, spaced, lateral ears 23—23 which form anchoring means for the chain 24 which leads to the brake mechanism proper of the car, the end link of the chain being engaged between the ears 23—23 and secured by a pin 25 extending through the link and aligned openings in said ears.

The arm C is of the shape shown in Figure 1, terminating in a hook portion 26 at its outer end. As will be seen upon reference to Figure 1, the hook portion 26 of the arm terminates short of the peripheral teeth of the gear wheel B.

As clearly shown in Figure 4, the pinion D, which meshes with the gear wheel B, is mounted above the latter and is formed integral with the ratchet wheel E and is concentric therewith. The pinion D and ratchet wheel E are rotatably journal on a cylindrical shaft 27 extending therethrough. The opposite ends of the shaft 27 are rotatably supported in bearing openings 28 and 29 of a swinging rocker member 30, hereinafter described.

The rocker member 30 is preferably in the form of a casting having cylindrical trunnions 31 and 32 at the outer and inner ends thereof. The inset portion 15 of the front wall 14 of the housing K is provided with a journal opening 33 within which the outer trunnion 31 is journaled. The rear wall 10 of the housing K is provided with an inwardly projecting hollow boss 34, the opening of which is cylindrical and coaxial with the journal opening 33. The boss 34 serves as a bearing support for the inner trunnion 32 of the rocker member 30. As shown in Figures 2 and 4, the trunnion 31 of the rocker 30 is provided with a coaxial extension 35 of square or other angular cross section, which projects outwardly of the housing. The rocker member 30 is actuated by the operating lever G, which is secured to the extension 35, the operating lever being provided with a square opening at its upper end receiving the extension 35. To secure the operating lever against accidental removal, a clamping nut 36 is employed which engages the outer side of the lever, the nut being threaded on a projection 37 on the square section 35 and secured against removal by a cotter pin. Inwardly of the trunnion 31, the rocker member is provided with an enlarged hub portion 38. The hub portion 38 and the trunnion 32 are connected by a yoke section 39 comprising spaced side arms or plates 40 and 41 and connecting end section 42. The arms 40 and 41 extend radially from the inner end portions of the hub 38 and the trunnion 32, respectively, and embrace the pinion D and ratchet E therebetween, the arm 40 being of thickened cross section where it projects from the hub. The outer end portion of the arm 40 is laterally, inwardly offset, as indicated at 43, whereby the offset of the arm overhangs the pinion D in clearing relation to the same. As will be evident upon reference to Figure 4, the opening 28 of the trunnion 32 extends entirely therethrough, thereby facilitating assembly of the parts, the shaft 27 being insertable through this opening, to engage the same through the openings of the ratchet E and pinion D and within the opening 29 of the hub portion 38 and trunnion 31 of the rocker.

The rocker casting 30 at the hub portion 38 thereof is further provided with a radial arm 44 in the form of a web projecting from the thickened portion of the plate or arm 40 of the yoke member 39, the arm 44 being offset circumferentially with respect to said yoke member. The arm 44 has the push bar or rod H supported therefrom, the latter being pivotally connected to the outer end of said arm. The push bar H is adapted to engage with the hook end 26 of the arm C and has its extremity rounded off, as shown in Figure 1, to properly fit within the socket formed by the hook.

The rocker member 30 carries the pawl J which cooperates with the ratchet wheel E. The pawl J is pivotally supported between the offset section 43 of the arm 40 and the arm 41 by a pivot pin 45 extending through said arms and the inner end of the pawl. At the free end the pawl J has a hooklike tooth 46 adapted to engage the teeth of the ratchet wheel. At the upper side of the pivoted end thereof, the pawl J is provided with an upstanding tail portion 47 by which the same may be tripped to disengage the tooth 46 from the ratchet E.

A depending cam projection 48 is provided on the top wall 16 of the housing for tripping the pawl by engagement of the tail 47 of the latter therewith as the rocker member 30 is oscillated.

The brake mechanism is normally held against retrograde movement by the locking dog F which has a toothed end cooperating with the teeth of the ratchet wheel. As shown in Figures 1 and 3, the dog F is pivotally supported above the ratchet wheel by a pivot pin 49 extending therethrough and having its opposite ends supported in bosses 50—50 projecting from the inner sides of the front and back walls of the housing K. The dog F is gravity influenced to engage the ratchet wheel E and ratchet thereover.

To effect release of the dog F from the ratchet wheel a throw-out mechanism is provided, comprising a short shaft 51 extending through a bearing opening provided in the inset wall portion 15 of the front wall 14 above the level of the pivot pin 49 on which the dog is mounted. The shaft 51 has an operating lever 52 fixed to the outer end thereof and carries a trip member 53 at the inner end. The trip member 53 is in the form of a collar fixed to said shaft 51 for rotation therewith. The trip member has a relatively thick, outwardly projecting lug 54 thereon and a radial, relatively sharp tooth 55 spaced from said lug. The lug 54 and tooth 55 are spaced about 90 degrees apart. The head of the dog is provided with a lateral projection 56 in the path of movement of the lug 54 and the tooth 55 so that the tooth 55 will have shouldered engagement with said projection 56 when the lever 52 is swung from right to left, to raise the dog out of engagement with the teeth of the ratchet wheel E. When the lever 52 has been swung to the left, beyond the vertical position, its weight holds the pawl out of engagement. When the lever 52 is swung in the reverse direction back to the position shown in Figure 1, the tooth 55 is returned to the original position shown, thereby receding from the dog and permitting the latter to return to its engaged position through the action of gravity. In the event that the dog does not engage the ratchet wheel through the action of gravity, due to some obstructing force, the same will be forcibly pressed into engaging position by action of the lever 52 through the medium of the lug 54 acting on the projection 56. Inasmuch as the lug 54 rests upon the lateral projection of the dog during normal operation of the brake mechanism, the weight of the overbalanced lever 52 will be added to the weight of the pawl in the performance of its ratcheting action.

The operation of my improved hand brake mechanism, in applying the brakes, assuming the parts are in the position shown in Figure 1, is as follows: The operator swings the handle lever from right to left toward the position shown in Figure 3, thereby imparting rotary swinging movement of the rocker 30 in clockwise direction. The arm 44 of the rocker is thus swung about the axis of the rocker in clockwise direction, imparting a pushing movement to the rod H which, by its engagement with the arm C, imparts rapid rotary movement to the winding drum A in contra-clockwise direction to wind the brake chain 24 thereon and quickly take up the slack in the brake mechanism proper of the car. In this connection it is pointed out that the arm 44 and rod H together form a toggle mechanism, whereby rapid movement is imparted to the drum at the beginning of the swinging movement of the arm 44 which changes to slower power movement as movement of the arm 44 continues due to opening of the toggle, as shown in Figure 3. During this swinging movement of the rocker 30 and the arm 44 thereof, the tail 47 of the pawl J is moved away from the cam projection 48, thereby permitting the pawl to drop into engaging position with respect to the ratchet wheel E. During the rapid movement of the chain winding drum, through operation of the push rod H, movement is necessarily imparted to the ratchet wheel E through the gear B and pinion D. Although the movement thus imparted to the ratchet wheel is in excess of the rotative rocking movement of the rocker at that time, there is no interference in the operation of the parts as the pawl J which is gravity influenced, is free to ratchet over the teeth of the ratchet wheel. Upon further oscillation of the operating lever handle G, the power is transmitted to the chain winding drum A through the power multiplying mechanism comprising the gear B and the pinion D, the pinion being intermittently rotated by engagement of the pawl J with the ratchet wheel E. During this action the push rod H is ineffective to rotate the drum A, the arm C of the drum having been advanced beyond the range of engagement of the rod H during the initial swinging movement of the lever G. The parts are so proportioned that slightly less than a single rotation of the drum is effective to fully apply the brakes, thus, the arm C comes into play once only during the brake tightening operation, that is, during the initial action while the slack in the chain is being taken up. During the chain winding operation, the locking dog F ratchets over the wheel E and holds the latter against retrograde movement.

After the brakes have been applied to the desired degree and the operator lets go of the handle lever G, the latter will gravitate to the pendant position shown in Figure 1, thereby returning the rocker to the position shown and throwing the pawl J out of operative engagement with the ratchet wheel by engagement of the tail of the pawl with the cam lug 48. Thus, when the brake is released by disengaging the dog F from the ratchet wheel E, the pawl J is clear of the ratchet and in no wise interferes with its rotation.

To release the brakes, the dog F is disengaged from operative holding engagement with the ratchet wheel E by operation of the lever 52, the latter being swung from right to left as seen in Figure 1, the dog being lifted by engagement of the tooth 55 of the trip member 53 with the projection 56 on said dog. When the dog has been disengaged, the parts are free to rotate and permit unwinding of the brake chain from the drum with resultant release of the brakes. The pull of the chain in unwinding from the drum effectively restores all of the parts to the normal position shown in Figure 1.

Referring next to the embodiment of the invention shown in Figure 6, the hand brake structure is the same as that illustrated in Figures 1 to 5 inclusive, with the exception of the throw-out mechanism for the locking dog and pawl which cooperate with the ratchet wheel.

As shown in Figure 6, the dog, which is indicated by L, is fixed to a shaft or pivot member 57 which is directly operated by a hand lever 58 fixed thereto. Disengagement of the dog from the teeth of the ratchet wheel E is effected by swinging the lever 58 from right to left.

The pawl for actuating the ratchet wheel E is indicated by M in Figure 6. The pawl M is pivotally supported on the rocker member 30 in the same manner as the pawl J hereinbefore described and cooperates with the ratchet wheel E in a manner similar to said pawl J. The pawl M in the normal position of the parts, that is, the position shown in Figure 6, is held out of engagement with the ratchet teeth of the wheel E by engagement of the toothed head of the pawl with the outer end of the dog L, the pawl M being provided with an inclined cam face 60 at said toothed end adapted to ride over a raised cam projection 61 on said dog as the rocker member 30 is swung toward the dog.

In releasing the brakes, the pawl J is lifted by the dog L as the latter is being disengaged from the ratchet and supported in disengaged position by said dog during the entire releasing action of the brakes.

Referring next to the embodiment of the invention illustrated in Figures 7 and 8, the hand brake structure is the same as that illustrated in Figures 1 to 5 inclusive, with the exception of the throw-out mechanism for the locking dog and pawl which cooperate with the ratchet wheel.

As shown in Figure 7, the dog, which is indicated by N, is fixed to a shaft or pivot pin 62 and is actuated by a lever, not shown, similar to the lever 58 shown in Figure 6. The dog N has a tooth 63 inwardly of its free end on the underneath side thereof adapted to engage with the teeth of the ratchet wheel E. Outwardly of the tooth 63 the dog is provided with a notch or seat 64 adapted to accommodate the rounded extremity of the pawl which is indicated by 66.

The pawl P is pivoted to the rocker member 30 in a manner similar to the pawl J shown in Figures 1 and 3. The pawl P has a tooth 65 on the underneath side thereof adapted to cooperate with the teeth of the ratchet wheel E in the same manner as the pawl J hereinbefore described. Outwardly beyond the tooth the pawl P is tapered as shown, said tapered portion being provided with said rounded end portion 66 adapted to engage within the seat 64 of the dog N to raise the latter out of engagement with the ratchet wheel when the rocker 30 is swung toward the dog, as indicated in dotted lines in Figure 7. Due to this engagement between the pawl and dog the pawl is also lifted as the dog is raised, thereby disengaging the tooth of the pawl from the ratchet.

The operating handle lever of the embodiment of the invention shown in Figures 7 and 8, in addition to serving as the means for actuating the brake, also serves as the operating handle lever means for disengaging the dog N and pawl P.

The operating handle lever shown in Figures 7 and 8, which is indicated by R, is connected to the rocker 30 in the same manner as the lever G of the brake mechanism shown in Figures 1 to 5 inclusive and serves to swing the rocker to and fro to actuate the chain winding drum in the manner described in connection with said Figures 1 to 5 inclusive. The lever R differs from the lever G in that it is composed of two parts hingedly connected by a bolt 67. The upper part of the lever R, which is indicated by 68, has a central depending tongue 69 embraced by a forked portion 70 at the upper end of the lower or handle portion 71 of the lever. The bolt 67 extends through said forked portion 70 and the tongue 69 to connect the parts of the lever. The handle portion 71 of the lever is thus mounted on the portion 68 for swinging movement outwardly away from the housing K in a vertical plane coincident with the axis of the rocker 30, that is, for swinging movement in a plane at right angles to the plane of rotation of the rocker 30. To limit inward swinging movement of the handle portion 71 of the lever, the branches of the fork are provided with upstanding stop lugs 72 adapted to engage in back of the upper part or member 68 of the lever. A projecting stop lug or arm 73 is provided on the housing K to limit swinging movement of the lever R to the right, as shown in Figure 7, when the handle portion 71 is in pendant position in vertical alignment with the upper section 68 of said lever. This vertically aligned condition of the sections of the lever R is the normal position at the time that the lever is swung from right to left and back, that is, swung to and fro in actuating the rocker 30 to wind the brake chain on the drum in tightening the brakes. This swinging movement of the lever R serves to actuate the rocker 30 in the manner described in connection with Figures 1 to 5 inclusive, first, actuating the push rod H to take up the slack, and then actuating the ratchet wheel E by means of the pawl P to operate the pinion and gear to multiply the power applied to rotate the winding drum.

To release the brakes, the handle portion 71 is pulled outwardly away from the housing K until the same clears the stop lug 73, whereupon the entire lever R is free to be swung to the right as shown in dotted lines in Figure 7. The release of the brake is then effected by swinging the lever R toward the dotted line position shown, thereby swinging the rocker 30 to the dotted line position and engaging the rounded end 66 of the pawl P with the notch 64 of the dog N to lift both the dog and the pawl out of engagement with the ratchet wheel. Unlocking of the ratchet wheel permits the brake drum to rotate freely and the chain to unwind therefrom. As will be evident, when the operator lets go of the handle lever 71, the entire lever R gravitates back to the pendant position shown in full lines in Figure 7 and the handle lever 71 swings into vertical alignment with the upper section 68 of the lever under the influence of gravity. Thus, the lever is again positioned to render the stop lug 73 effective to restrict movement of the lever to the right, thereby preventing swinging movement of the rocker to an extent which would effect complete disengagement of the pawl P and dog N from the ratchet wheel.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain winding drum; of a gear rotatable with said drum; a pinion meshing with said gear; a ratchet wheel rotatable with said pinion; a pivoted operating lever; an arm operatively connected to the lever and extending radially of the pivotal axis of said lever; a push rod connected to the outer end of said arm having engagement with said gear for actuating the same to rotate said drum; and a pawl eccentrically mounted with respect to the pivotal axis of said lever and actuated by said lever, said pawl being engageable with said ratchet wheel for actuating the same.

2. In a hand brake mechanism, the combination with a rotary chain winding drum; of a swinging operating lever pivotally mounted eccentrically to the drum; a radial arm on said drum; and a push rod eccentrically pivoted on said lever engageable with said arm to rotate the drum as said lever is swung on its pivot.

3. In a hand brake mechanism, the combination with a rotary chain winding drum member having an abutment eccentric to its axis of rotation; of a push rod engageable with said abutment to rotate the drum; and a swinging lever for actuating said push rod.

4. In a hand brake mechanism, the combination with a rotary member having a chain winding drum section; of a push rod engageable with said member at a point eccentric to its axis of rotation for rotating the same; a swinging lever for actuating said push rod; a power multiplying pinion and gear drive for said drum; and ratchet means for rotating said pinion, including a ratchet wheel rotatable with said pinion and a pivoted pawl carried by said lever.

5. In a hand brake mechanism, the combination with a rotary chain winding drum member having an abutment eccentric to its axis of rotation; of a swinging operating lever; a push rod eccentrically connected to said lever and engageable with said abutment to rotate said drum member when the lever is swung in one direction; a power multiplying pinion and gear drive for said drum member; and ratchet means actuated by rocking movement of said lever for intermittently rotating said power multiplying drive to rotate said drum.

6. In a hand brake mechanism, the combination with a rotary chain winding drum; of a gear fixed to said drum for rotation in unison therewith; a radial arm fixed to said gear; a pinion meshing with said gear; an operating lever swingable about the axis of rotation of said pinion; ratchet means actuated by swinging movement of said lever for intermittently rotating said pinion; and a push rod eccentrically pivoted on said lever and engageable with said radial arm for actuating said gear to rotate the chain winding drum.

7. In a hand brake mechanism, the combination with a rotary member having a chain winding drum section; of a radial arm on said member; a gear rotatable with said member; a pinion meshing with said gear; a rocker swingable about the axis of rotation of said pinion; a ratchet wheel rotatable with said pinion; a pawl pivoted on said rocker and engageable with said ratchet wheel for actuating the same; and a push rod eccentrically connected to said rocker and engageable with said radial arm to actuate said rotary member.

8. In a hand brake mechanism, the combination with a rotary member having a chain winding drum section; of a radial arm on said member; a gear rotatable with said member; a pinion meshing with said gear; a rocker swingable about the axis of rotation of said pinion; a ratchet wheel rotatable with said pinion; a pair of circumferentially offset radial arms on said rocker; a pivoted pawl carried by one of said arms cooperating with said ratchet wheel; a push rod pivotally connected at one end to the other of said arms of said rocker and having the other end engageable with the radial arm of said member to rotate the latter; and lever means for swinging said rocker.

9. In a hand brake mechanism, the combination with a rotary member having a chain winding drum section; of a radial arm on said member; a gear rotatable with said member; a pinion meshing with said gear; a swingable member rotatable about the axis of rotation of said pinion; a ratchet wheel rotatable with said pinion; a pair of circumferentially offset arms radially extending from said swingable member; a pivoted pawl carried by one of said arms of the swingable member cooperating with said ratchet wheel; a push rod pivotally connected at one end to the outer end of the other arm of said swingable member, said push rod having the other end thereof engageable with the outer end of the radial arm of said rotary member to actuate the latter; and lever means for oscillating said swingable member.

10. In a hand brake mechanism, the combination with a rotary chain winding drum; of a swinging operating lever pivotally mounted eccentrically to the drum; a radial arm on said drum; a member swingable with said lever; a push rod eccentrically pivoted on said member engageable with said arm to rotate the drum as said lever is swung on its pivot; power multiplying drive means for said drum including a gear and a driving pinion; a ratchet wheel rotatable with said pinion; a pivoted locking dog for holding said ratchet wheel against retrograde movement; a pawl eccentrically pivoted on said member for actuating said ratchet wheel upon swinging movement of said lever; trip means engageable by said pawl when said lever is in pendant position for holding said pawl disengaged from said ratchet means; and lever means for disengaging said dog from the ratchet wheel to release the brakes.

11. In a hand brake mechanism, the combination with a rotary chain winding drum; of power multiplying means for rotating said drum; ratchet means for actuating said power multiplying means including a ratchet wheel and a cooperating pawl; a swingable carrier for said pawl; a pivoted locking dog cooperating with said ratchet wheel; fixed trip means engageable by said pawl in its movement with said carrier for disengaging the pawl from the ratchet wheel; a releasing lever pivoted eccentrically to the pivot of the locking dog; and radially projecting spaced lugs on said releasing lever respectively having shouldered engagement with the dog as the lever is swung in reverse directions to respectively disengage the dog from the ratchet wheel and force the same into engagement therewith.

12. In a hand brake mechanism, the combination with a rotary chain winding drum; of a swinging operating lever pivotally mounted eccentrically to the drum; a radial arm on said drum; a member swingable with said lever; a push rod eccentrically pivoted on said member engageable with said arm to rotate the drum as said lever is swung on its pivot; power multiplying drive means for said drum including a gear and a driving pinion; a ratchet wheel rotatable with said pinion; a pivoted locking dog for holding said ratchet wheel against retrograde movement; a pawl eccentrically pivoted on said member for actuating said ratchet wheel; and a cam shoulder on said dog engageable by said pawl when said lever is swung to pendant position for holding said pawl disengaged from the ratchet wheel.

13. In a hand brake mechanism, the combination with a rotary chain winding drum; of a swinging operating lever pivotally mounted eccentrically to the drum; a radial arm on said drum; a rocking member actuated by said lever; a push rod eccentrically pivoted on said member engageable with said arm to rotate the drum as said lever is swung on its pivot; power multiplying drive means for said drum including a gear and a driving pinion; a ratchet wheel rotatable with said pinion; a pivoted locking dog for holding said ratchet wheel against retrograde movement; a pawl eccentrically pivoted on said member for actuating said ratchet wheel; and an inclined face on said pawl adapted to ride over the dog and be supported thereby when said lever is swung to pendant position for holding said pawl disengaged from said ratchet wheel.

14. In a hand brake mechanism, the combination with a rotary chain winding drum; of a swinging operating lever pivotally mounted eccentrically to the drum; a radial arm on said drum; a member swingable with said lever; a push rod eccentrically pivoted on said member engageable with said arm to rotate the drum as said lever is swung on its pivot; power multiplying drive means for said drum including a gear and a driving pinion; a ratchet wheel rotatable with said pinion; a pivoted locking dog for holding said ratchet wheel against retrograde movement; a pawl eccentrically pivoted on said member for actuating said ratchet wheel; an inclined face on said pawl adapted to ride over the dog and be supported thereby when said lever is swung to pendant position for holding said pawl disengaged from said ratchet wheel; and lever means for lifting said dog out of engagement with the ratchet means while supporting said pawl.

15. In a hand brake mechanism, the combination with a rotary chain winding drum; of a swinging operating lever pivotally mounted eccentrically to the drum; a radial arm on said drum; a member swingable with said lever; a push rod eccentrically pivoted on said member engageable with said arm to rotate the drum as said lever is swung on its pivot; power multiplying drive means for said drum including a gear and a driving pinion; a ratchet wheel rotatable with said pinion; a pivoted locking dog for holding said ratchet wheel against retrograde movement; a pawl eccentrically pivoted on said member for actuating said ratchet wheel; and means on said pawl engageable with the dog when said lever is swung in one direction to lift said dog out of engagement with the ratchet wheel.

16. In a hand brake mechanism, the combination with a rotary chain winding drum; of a swinging operating lever pivotally mounted eccentrically to the drum; a radial arm on said drum; a member swingable with said lever; a push rod eccentrically pivoted on said member engageable with said arm to rotate the drum as said lever is swung on its pivot; power multiplying drive means for said drum including a gear and a driving pinion; a ratchet wheel rotatable with said pinion; a pivoted locking dog for holding said ratchet wheel against retrograde movement; a pawl eccentrically pivoted on said member for actuating said ratchet wheel, said lever being normally maintained in pendant position through the influence of gravity; and means on said pawl engageable with the dog to disengage the dog from said ratchet when said lever is swung from said pendant position in a direction to move the pawl toward said dog.

17. In a hand brake mechanism, the combination with a rotary chain winding drum; of a swinging operating lever pivotally mounted eccentrically to the drum; a radial arm on said drum; a member swingable with said lever; a push rod eccentrically pivoted on said member engageable with said arm to rotate the drum as said lever is swung on its pivot; power multiplying drive means for said drum including a gear and a driving pinion; a ratchet wheel rotatable with said pinion; a pivoted locking dog for holding said ratchet wheel against retrograde movement; a pawl eccentrically pivoted on said member for actuating said ratchet wheel, said lever being normally maintained in pendant position through the influence of gravity, said lever having a handle section pivotally connected thereto for outward swinging movement; a fixed stop member engageable by the handle section of said lever when in its pendant position for holding said lever against swinging movement in one direction from said pendant position, said handle member being swingable outwardly on its pivot to clear said stop member and permit swinging movement of said lever in said one direction; and means on said pawl engageable with the dog to disengage said dog from the ratchet wheel when said lever is swung from said pendant position in said one direction.

ROLAND J. OLANDER.